United States Patent
Bates

(10) Patent No.: US 11,328,095 B2
(45) Date of Patent: May 10, 2022

(54) PECEPTUAL VIDEO FINGERPRINTING

(71) Applicant: Attestiv Inc., Natick, MA (US)

(72) Inventor: John W. Bates, Mendon, MA (US)

(73) Assignee: Attestiv Inc., Natick, MA (US)

( * ) Notice: Subject to any disclaimer, the term of this patent is extended or adjusted under 35 U.S.C. 154(b) by 0 days.

(21) Appl. No.: 16/736,265

(22) Filed: Jan. 7, 2020

(65) Prior Publication Data
US 2021/0209256 A1 Jul. 8, 2021

(51) Int. Cl.
| | |
|---|---|
| *G06K 9/62* | (2006.01) |
| *G06F 21/64* | (2013.01) |
| *G06K 9/00* | (2022.01) |
| *G06N 3/08* | (2006.01) |
| *G06N 3/04* | (2006.01) |
| *G06T 7/00* | (2017.01) |

(52) U.S. Cl.
CPC ......... *G06F 21/64* (2013.01); *G06K 9/00744* (2013.01); *G06K 9/00758* (2013.01); *G06K 9/6215* (2013.01); *G06K 9/6256* (2013.01); *G06N 3/04* (2013.01); *G06N 3/08* (2013.01); *G06T 7/0002* (2013.01); *G06T 2207/10016* (2013.01); *G06T 2207/20076* (2013.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| | | | |
|---|---|---|---|
| 8,830,331 B2 | 9/2014 | Haritaoglu | |
| 8,953,836 B1 | 2/2015 | Postelnicu et al. | |
| 9,177,209 B2 | 11/2015 | Chang et al. | |
| 10,339,959 B2 | 7/2019 | Bauer et al. | |
| 2013/0259228 A1 | 10/2013 | Ren et al. | |
| 2014/0152760 A1* | 6/2014 | Granstrom | G06F 16/70 |
| | | | 348/14.08 |
| 2015/0125036 A1 | 5/2015 | Bilobrov | |
| 2018/0114017 A1 | 4/2018 | Leitner et al. | |
| 2018/0218753 A1 | 8/2018 | Hodge et al. | |
| 2019/0164173 A1 | 5/2019 | Liu et al. | |
| 2019/0391972 A1 | 12/2019 | Bates et al. | |
| 2020/0145692 A1* | 5/2020 | Xu | H04N 19/59 |

(Continued)

FOREIGN PATENT DOCUMENTS

WO 2019006272 A1 1/2019

OTHER PUBLICATIONS

Guera et al., "Deepfake Video Detection Using Recurrent Neural Networks," Video and Image Processing Laboratory (VIPER), Purdue University; 15th IEEE International Conference on Advanced Video and Signal Based Surveillance (AVSS), pp. 1-6 (2018).

(Continued)

*Primary Examiner* — Xin Jia
(74) *Attorney, Agent, or Firm* — David J. Thibodeau, Jr.; VLP Law Group LLP

(57) ABSTRACT

Techniques for authenticating digital media asset, and particularly to verifying the authenticity of digital image or video files which may have been redacted or otherwise altered in some way. The approach, which we call perceptual video fingerprinting, compares media assets based on what humans perceive, rather than exactly which bits match, by using neural network algorithms.

13 Claims, 8 Drawing Sheets

(56) References Cited

U.S. PATENT DOCUMENTS

2020/0242623 A1* 7/2020 Savir .................... G06N 3/0454
2020/0401850 A1* 12/2020 Bazarsky ................. G06N 3/08
2021/0042529 A1* 2/2021 Price ................. G06K 9/00281
2021/0127085 A1* 4/2021 Greaves .................. G06F 21/16

OTHER PUBLICATIONS

Dolhansky et al., "The Deepfake Detection Challenge (DFDC) Preview Dataset", pp. 1-4 (2019).
International Search Report and Written Opinion dated Apr. 12, 2021 for Related PCT/US21/12435.

* cited by examiner

PECEPTUAL VIDEO FINGERPRINTING

TECHNICAL FIELD

This patent application relates to data authentication, and more particularly to verifying the authenticity of digital image or video files which may have been redacted or otherwise altered in some way.

BACKGROUND

Authentication is the practice of validating the identity or accuracy of an item. Authentication can be useful whenever a data processing system is responsible for handling an important data asset such as a photograph, video, or sensitive document. Recent incidents involving "deep fakes" and other altered files have lead to malicious hoaxes, financial fraud, embarrassment, customer loss and even regulatory fines. A robust approach to authentication can avoid these problems.

SUMMARY

Our approach to authenticity is not to simply prove that a random digital media asset has been altered, but instead is to prove that a registered asset has not been altered. We think of it as "getting the receipt up front": an asset should be proven to be authentic before it can be accepted for further processing.

In our approach, an original of the digital media asset may be first registered by creating a fingerprint, which is then added to a blockchain entry which is presumably unalterable as a public record. For photographs, that fingerprint may simply be an algorithmic (e.g., SHA256) hash of the binary contents of the image data. We can thus scan through the image file headers until we locate the image data, then hash the contents found there, and use that hash as a fingerprint. By the nature of hashing, any version of the original asset that is altered will thus have a radically different fingerprint.

Of course, certain alterations to images are inevitable. Images are often scaled for better web delivery, or have altered contrast to bring out the details, or maybe have small brightness and saturation changes to improve comprehensibility. A premise of our approach to authenticity is that those changes should be tracked by using a controlled editor, which, upon every change, creates a new fingerprint that is linked on the blockchain back to the parent asset. See for example, our co-pending U.S. patent application Ser. No. 16/445,478 filed Jun. 19, 2019 entitled "Atomic Capture of a Set of Related Files, Using a Distributed Ledger, for Proof of Authenticity", the entire content of which is hereby incorporated by reference.

In this way, any image that is delivered via the web is now traceable back to the original, and the chain of custody should now therefore be immediately apparent.

The notion of importing assets into our system is a slightly less rigorous model: in this case, we are simply recording some precise facts about the image at the point of time of import, such as the web site from which it was downloaded, time, IP address, etc., in order to establish an origin point for the chain of custody. We are no longer asserting that the asset is any way resembles the point of capture: instead we are asserting the facts of acquisition.

When it comes to video, the above approach to fingerprinting can tend to break down. Delivering a movie or even a short clip over the internet is extremely resource intensive. Thus it is now typical for digital videos to be transcoded in a myriad of ways to compress large amounts of data. Videos are also often rescaled to enable display on devices ranging from smartphones to PCs to large screen high definition or 4K televisions. Still further coding and/or protocols is applied to optimize it for streaming over a variety of wired and wireless networks which may result in data loss. All of these aspects of media delivery systems act in different ways to compress, alter, and stream data over vast networks.

We have realized that humans tend to only be looking at a single video frame out of, say, the thirty that flashed by in the last second. Thus a human is not likely to notice if one, ten, or even a thousand pixels in a video don't match up exactly.

However the simple application of hash algorithms to video matching most certainly will detect these differences. Fingerprinting by hashing is an exact science, meant for dealing with precise data. Presented with a video that's been scaled, transcoded, and then streamed over a network with stochastic error, it is quite unlikely that enough data can be fingerprinted using hashes alone to decide that yes, this video is the same as the one registered on the blockchain.

The approach we discuss here thus uses a different kind of fingerprinting. We call it perceptual video fingerprinting, because it attempts to compare videos based on what humans perceive, rather than exactly which bits arrive. To do so, we make extensive use of modern neural network algorithms and designs, for which modeling object recognition and feature detection can be applied.

We use those deep learning abilities in unique ways. As one example, a deep learning network is used to use them to pick out the features that "matter" when a human looks at two different versions of the same video. The problem presented to the deep learning engine is "If one watches a video on YouTube on a smartphone over the cellular network, and then watches it again later at night on a high definition television at home, can you tell it is the same video?

Depending on the specific content of the video, it may be that the precise differences cannot be detected by a human. For example, there are probably more details that can be can picked out when seen on a 50" screen that just can't be detected on a 5" smartphone. But there is still enough similarity for a person to be able to immediately recognize that "Oh, yeah, that's the same clip I watched on the bus".

By training our deep learning network not just to recognize features, but to also recognize which features matter, we provide a system that judges the authenticity of videos in the same way that humans do: perceptually. We can take the kind of unimportant changes that transcoding and streaming delivery cause and remove them from the evaluation.

Furthermore, by building additional training models, our system can learn to take certain kinds of admissible changes into account. There are many use cases which include and even require alterations to the original video, privacy being foremost. A surveillance video from which bystander's faces have been blurred out, for example, is a standard practice for privacy protection. But how is one to judge the authenticity of that video? It has clearly been altered, and who is to say that the redactions were the only alteration? One can't point back to the original video for the very reasons that the changes were made in the first place.

Our perceptual fingerprinting system can be trained to ignore such redactions. By including redacted video in our training sets and regimen, we can teach a deep learning network that a reacted video which is in all other ways identical to the original can be regarded as authentic. (In some implementations, the fingerprint of the redacted video may be evaluated in a separate system, so that the original must be fingerprinted twice: once for the original perceptual fingerprint, and once for the redacted perceptual fingerprint.) Essentially, the redacted fingerprint has been "taught" to regard blurred faces as acceptable substitutes for real faces.

Further enhancements to the training methods may be used to increase accuracy. For example, by providing our own deep fakes as inputs, substituting artificial faces for the real ones in the dataset, we can teach the system to scrutinize faces far more carefully, in much the same way that humans actually do. Thus on the one hand, we can teach a deep learning network to accept blurred out human faces, and on the other, we can force it to become hyper-aware of the details of human faces.

BRIEF DESCRIPTION OF THE DRAWINGS

The enclosed drawings are provided for purposes of illustration only and are used to depict and describe one or more example implementations. The drawings and the text that follows are thus intended to facilitate understanding of these example implementations, and shall not be considered limiting of the breadth, scope, or applicability of the disclosure.

DETAILED DESCRIPTION OF A PREFERRED EMBODIMENT

The fundamental basis for any deep learning system is the data that it is given to train on. A substantial part of the process of building our system is thus the creation of a comprehensive set of videos laid out in such a way as to emphasize the details that matter for our authenticity tasks.

Figure 1:
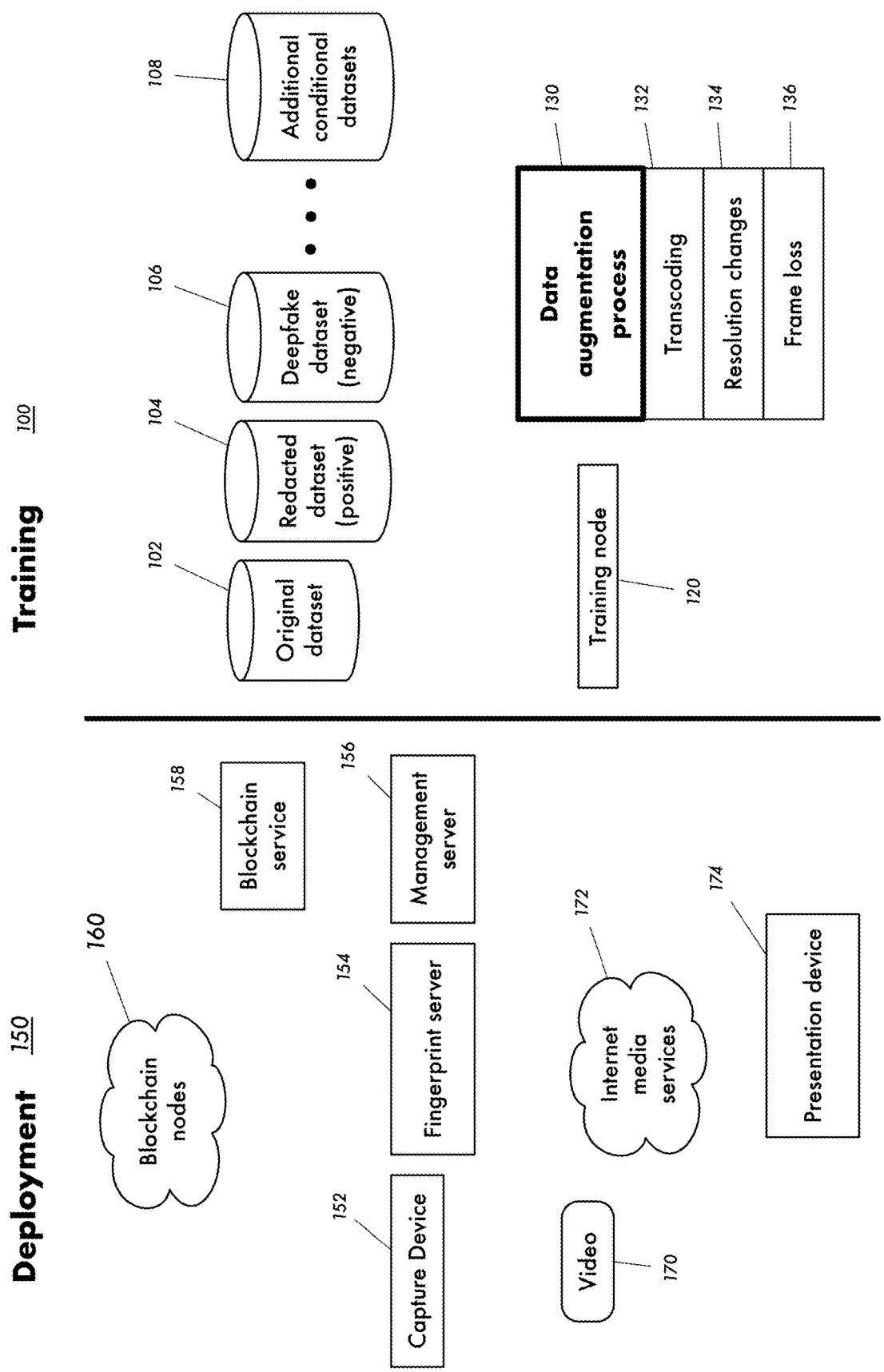
FIG. 1 is a high level diagram of a deployment system and training system.

FIG. 1 is a high level diagram of an example system. IT includes a training component 100 consisting of an original dataset 102, redacted dataset (positive) 104, deepfake dataset (negative) 106, and one or more additional datasets 108. A training node 120 executes a number of processes, at least one of which, data augmentation 130 consists of transcoding 132, resolution changes 134, and frame loss 136.

The example system also has a deployment component 150 consisting of a capture device 152, fingerprint server 154, management server 156, blockchain service 158, blockchain nodes 160, video 170, internet media services 172 and a presentation device 174.

Figure 2:
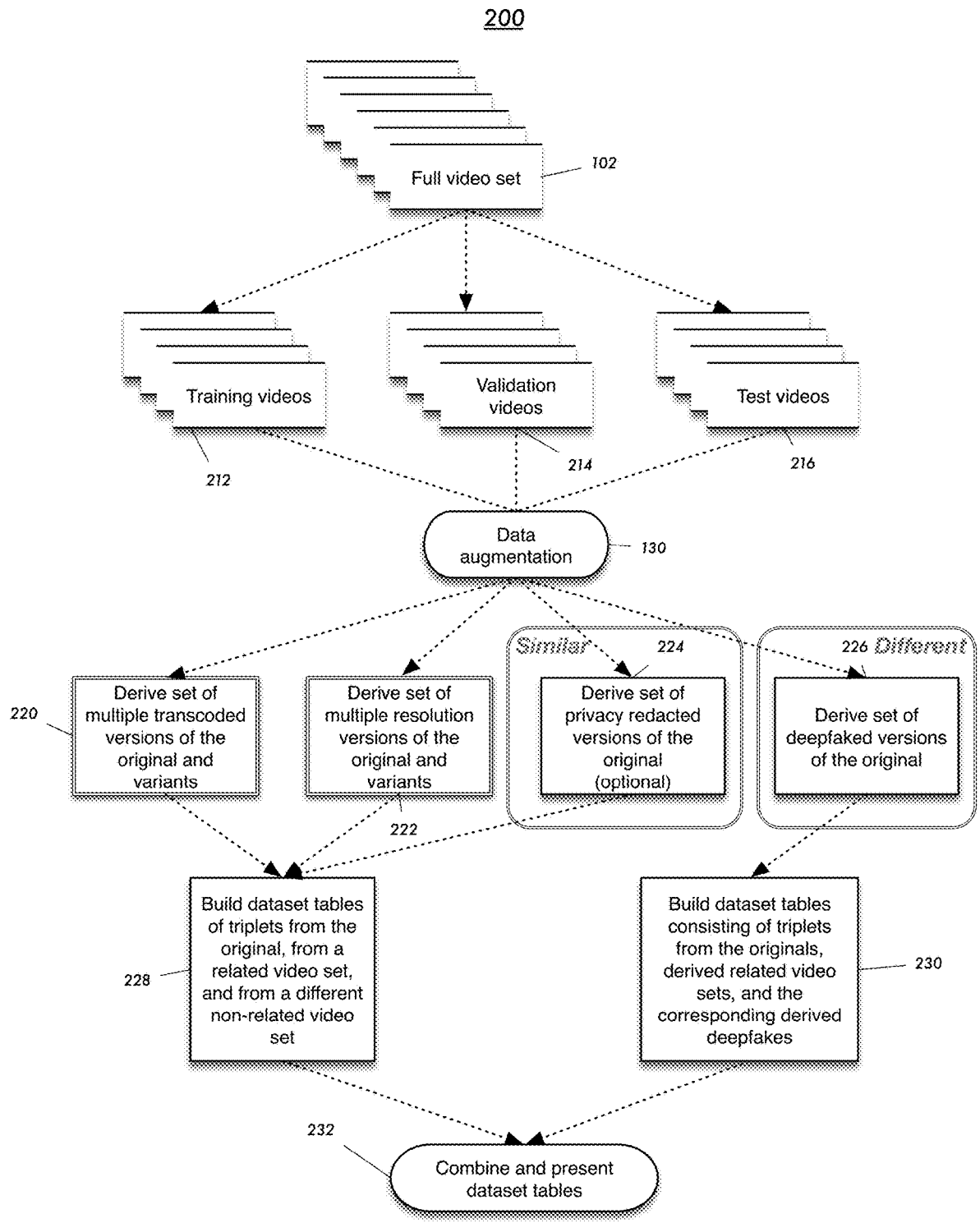
FIG. 2 is a flow for dataset preparation.

FIG. 2 is high level process flow for dataset preparation 200, executed on the training component 100. Starting with a large collection of videos (such as from the original dataset 102 in FIG. 1), we break out three subsets: training videos 212, validation videos 214, and test videos 216. Each of these subsets is distinct, with no videos shared among any of the subsets.

The training videos 212 are supplied to our network as the data on which our learning is done.

Validation videos 214 are used during the training process to monitor the progress of our training: after some predetermined number of training cycles have been completed, the validation videos 214 are processed through the current state of the network, and the performance is evaluated by performing comparisons between the videos described in each element of the dataset. As the training progresses, the validation process should rate similar videos as scoring increasingly close to each other, while different videos get farther apart.

Test videos 216 are only supplied to our network after training has completed, in order to evaluate the overall performance of the solution. It is important that they be distinct from the validation set 214, even though they serve a similar purpose, because we do not want our test data to influence the training process. If that were to occur, it is likely that our network will simply "learn to the test", finding solutions that fit the test set well but fail on other types of data.

In order to build our robust solution, we rely on a data augmentation process 130 to create both similar and different videos to be used in training. For each original video, we create multiple copies, each processed according to a set of rules that represent changes that will happen in real-world scenarios.

Transcoding 132 is the most common form of acceptable change that we expect to see. A video camera will produce raw video using any one of a number of different encoding schemes, depending on processing power, sensor resolution, available memory, and other factors. On the other hand, the end user may receive the video in another totally different encoding scheme, optimized for streaming delivery, storage space, or other considerations. In order to go from one encoding to another, at state 220 the video is "transcoded" from the original to derive one or more other encodings. Each encoding (and therefore transcoding) introduces its own optimizations and tradeoffs, resulting in motion, video, and audio artifacts that can vary substantially from the original. Every original video in our dataset, then, is processed once through each of multiple transcoders, resulting in multiple additional copies.

Videos having display resolution changes 222 are also extremely common. While the original video may have been recorded at a very high resolution, the end user receives video in a size that is appropriate for the device and delivery method that they have available at the time of viewing. Changing the resolution of the image also introduces its own set of artifacts which must be accounted for when comparing videos.

In the case in which we wish to evaluate the authenticity of redacted videos, we must also prepare redacted video sets 224 for training, validation, and testing. Using standard tools for privacy redaction, we can take a large number of videos from our original dataset and make duplicates that are labeled "similar" to the originals.

In order to ensure that the network learns to focus on features that are likely to be important for authenticity, we must find a way to make videos in our datasets that are as similar to the originals as possible, while still differing by key features. To do so, we make "deepfakes" 226, which are videos generated by deep learning processes that are different, such as by replacing the faces of the original video with different ones. By labeling these deepfakes as "different" from the originals, the training algorithms will force the network to weight more heavily the features that humans use to differentiate between people visually.

In general, then there are two different classes of sets of videos that we create to augment our data sets: the "similar" 224 and the "different" 226. Similar videos are ones that we wish the network to learn to rank closely, and different videos are those which should be ranked far apart. In our example, redacted videos are designated as similar, since we wish them to be recognized as authentic, and deepfakes are different, since we wish them to be recognized as altered.

Augmentation via transcoding and resolution changes 222, on the other hand, are changes that we expect to see any time anything other than the raw video is seen, so we need to use them to augment not only the original videos, but the variants which may be similar or different. That is, if we generate two different transcoding and three different resolutions, we will actually have six copies of the original video (two transcoding, each at three resolutions). When we add in redacted and deepfaked versions, we apply the same augmentations to each of the results, resulting in eighteen total videos in our example dataset.

From the combination of original videos and our augmented creations, we build what we call the actual dataset tables 228. A dataset table 228 consists of sets of triplets: the first item being an original video (e.g., one of 212, 214, or 216), the second being one of the similar augmented videos (one of 224, 222, 220), and the third being a video that is "different" (one of 226, 212, 214, or 216). The "different" video is drawn from one of two sets: either a completely different video drawn from the dataset (e.g. one of 212, 214, or 216) or a version that has been augmented to highlight a create a significant difference from the original, e.g. a deepfake produced in 226.

The mathematically astute may notice that if we follow a simple rule that all variants must be matched with the original at least once, including all variants of the "different" video, the number of dataset elements expands geometrically in the number of variants for each term. In our example above of two transcoders and three frame resolutions, we would arrive at 6×6×6 dataset entries if we included all privacy redacted variants and all deepfake variants. It is therefore entirely acceptable to instead sample from the set of possible combinations in the case that the resulting datasets would be unmanageable.

Training Workflow

Once we have prepared our datasets, including training, validation, and test sets, we are ready to begin training.

In one preferred approach, the network is designed as what is termed a "Siamese" network, in which several data elements are passed through a single network and the results are combined via a loss function. The results of the loss function are back-propagated through the network using standard neural network algorithms to adjust the weights of that network, with the goal that network will learn a function that will encode video sequences into a sequence of bytes, substantially smaller than the original video, that can be used as a basis for video comparisons.

Figure 3:
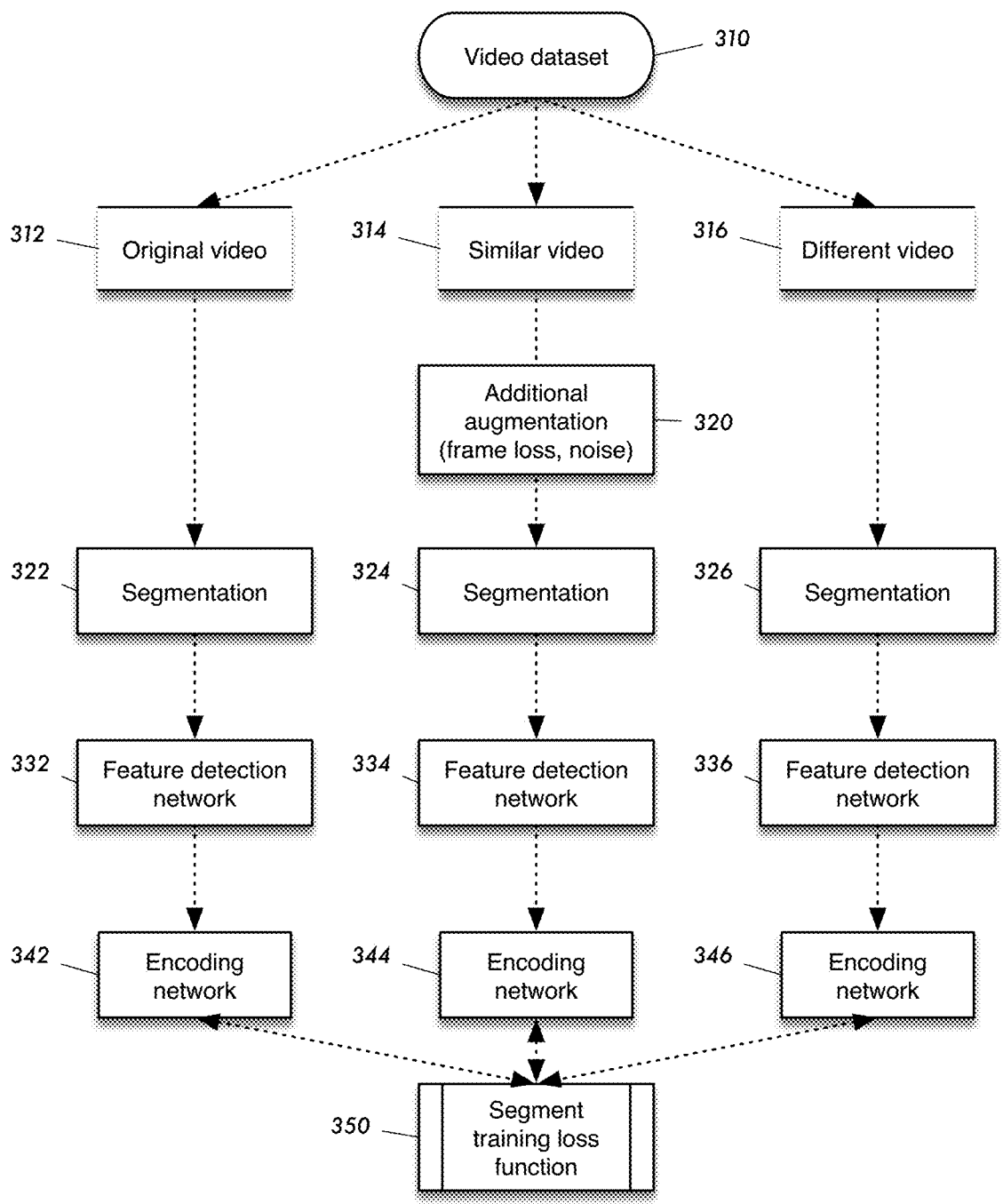
FIG. 3 is a training workflow.

FIG. 3 is an example training workflow 300. Given our dataset tables at 310, the data elements in a single row are extracted as the original 312, similar 314, and different 314 videos. For a number of reasons including efficiency and the utility of fingerprinting video clips, the incoming videos may be segmented at respective steps 322, 324, 326, that is broken into shorter segments. In some implementations, the segments are of a fixed length, but in others the segmentation may itself be based on deep learning recognition techniques (for example to find the natural transitions in a video).

Once broken apart, the segments are further broken down into frames, each of which is run through a respective feature detection network (332, 334, 336): typically a deep convolutional network with a commonly used architecture such as Microsoft Research's ResNet. Many of these feature detection networks are available with pre-trained weights, substantially reducing the amount of time needed for training. Each layer of such a network learns to identify first simple features, such as vertical or horizontal lines, and then the network learns to aggregate. The simple features become more complex as the network grows deeper, progressing to more expressive features like circles, and eventually learning complex structures such as faces or objects.

The outputs of these networks (332, 334, 336) indicate the presence and structure of these complex features represented in a vector format. Each frame is passed through the network and the resulting vector is stacked with the vectors from the other frames in the segment, resulting in a feature sequence.

One interesting exception are the "similar" video segments, which may receive additional augmentation 320 before being run through the segmentation and feature detection network. This may be done in order to simulate the effect of network errors and other possible environment degradation that may occur during the transmission of the video. The most common result of such degradation is frame loss, although other errors may occur dependent upon the specific encoding scheme. For that reason, we can randomly corrupt in a constrained way some of the frames in the "similar" segments, to simulate environment degradation that can be learned to be mildly ignored.

The feature sequence is then passed to an encoding network (342, 344, 346), which is a single network, shared among the different input video types, that learns the function mapping video segments to perceptual fingerprints. It could be regarded as learning something like a hash function, in which a large amount of data is mapped to a much smaller set of bytes. But unlike the random, secure hashes (or purely algorithmic hashes like SHA-256), it maps sequences which are perceptually similar to each other to closer regions in a multi-dimensional hash space. The encoding network can thus also use deep learning architectures and/or algorithms to provide an encoding network that exhibits these properties.

A final step in the training workflow is a training loss function 350. It is used by the neural network architecture to evaluate for each single data point exactly how well the network is learning the encoding (fingerprinting) functions 332, 334, 336, in such a way as to provide a numerical value that can be used to adjust the weights within the encoding network. In our case, the loss function may be a variation of a triplet-loss function, taking as inputs the encodings of each of the original, similar, and different segments and arriving at a single loss value, which is propagated back through the encoding network and used to adjust the weights.

Figure 4:
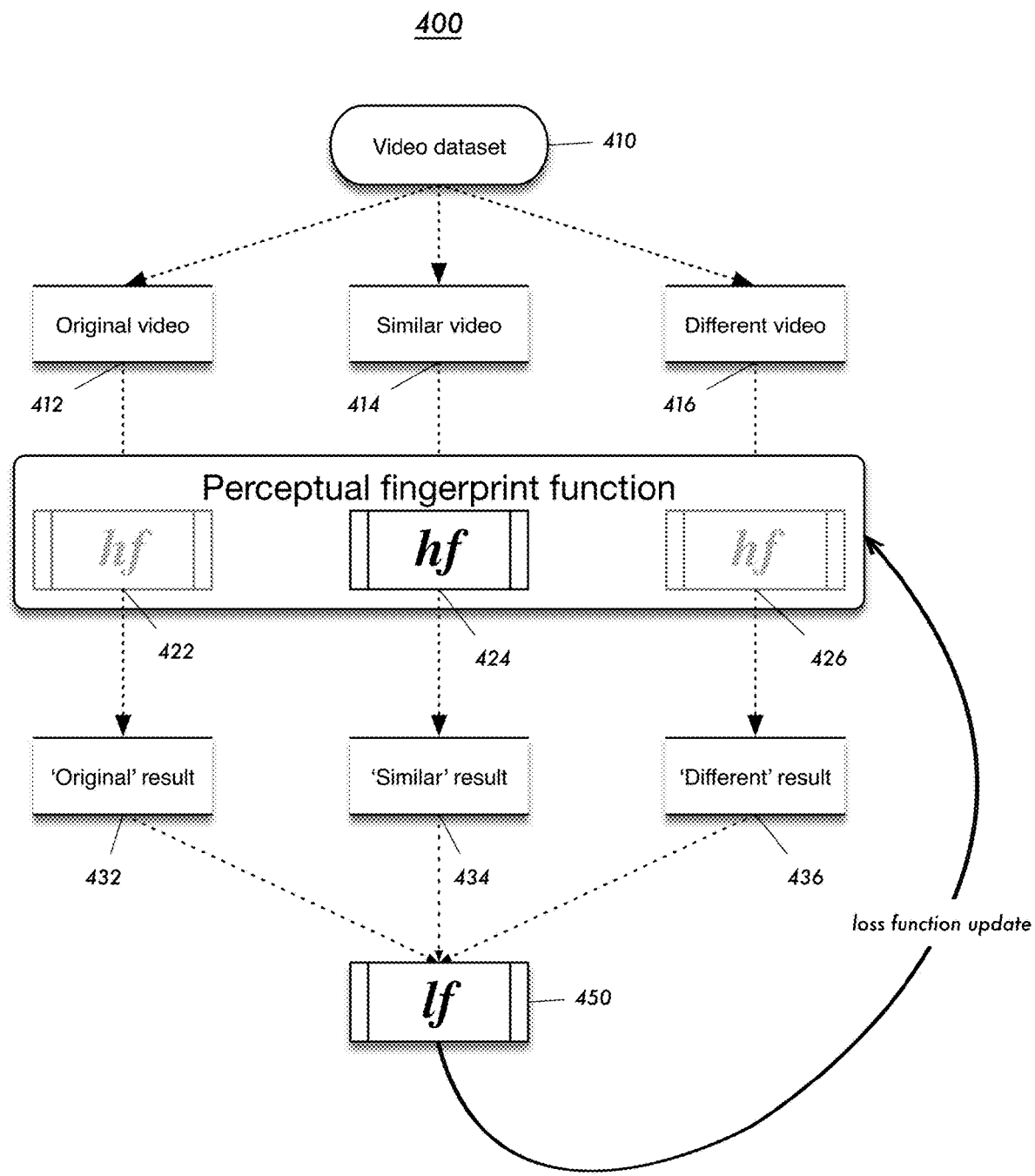
FIG. 4 shows a loss function update.

A high level view of the training process is FIG. 4. The hash function (422, 424, 426) is a mathematical function with a large number of internal parameters which will transform video inputs (412, 414, 416) into perceptual fingerprint results (432, 434, 436). The loss function 450 is a fixed mathematical function which evaluates the results of the perceptual fingerprint function, and the update 452 is an operation which adjusts the parameters of the hash function in order to minimize the loss function.

The output of the loss function is used to adjust the parameters of the hash function using the standard deep learning backpropagation algorithm, in which the gradient of the loss function is computed with respect to the weights of the network, and the weights adjusted accordingly.

Training of this network is thus done at the segment level. The segments of each video themselves become individual data points to train it.

Perceptual Fingerprint Creation

Figure 5:
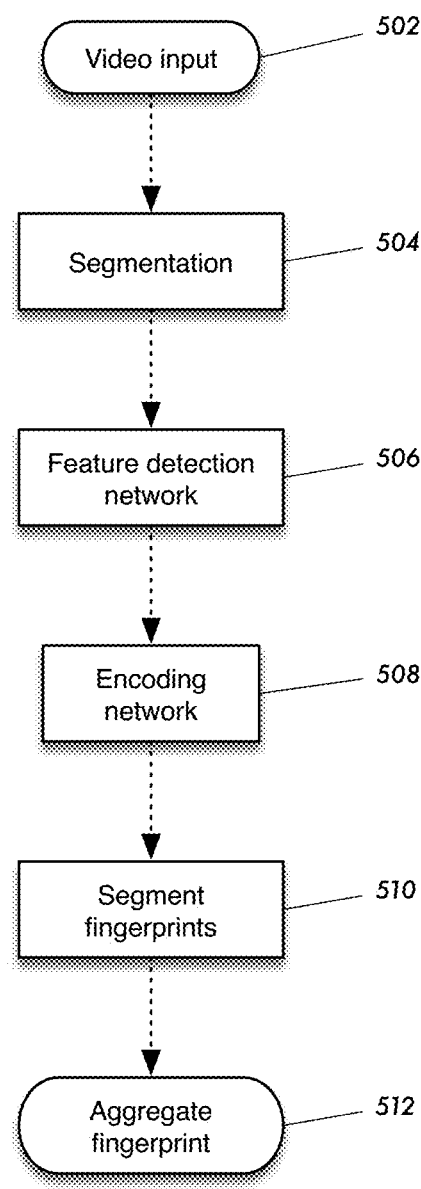
FIG. 5 is a flow for creating a perceptual fingerprint.

Once the encoding network(s) (332, 334, 336) have been trained to create a fingerprint from a video input, they can then be used in deployment 150 (FIG. 2) as part of Perceptual Fingerprint creation 500. Referring to FIG. 5, as opposed to what was done in training 100, an input video dataset in the deployment mode will contain only original 412 videos. The encoding network previously derived in the training mode (FIG. 3) now take on a role of perceptual fingerprint functions 422.

Thus, when the perceptual fingerprint functions receive a video input that is meant to be fingerprinted, it follows a similar flow as that of the training network, but on an original video only. (Which of course makes sense, since we are training networks to be deployed.) As shown in the workflow of FIG. 5, the input video 502 is first segmented at step 504 according to whatever approach was taken in the training of the network, and the segments are optionally broken into frames. The frames are then fed at step 506 through the feature detection network and aggregated into feature segments. The feature segments are fed at step 508 through the perceptual fingerprint function (encoding network) 422, resulting in segment fingerprints.

It is worth noting here the differences between the perceptual fingerprint creation network and the perceptual fingerprinting training network. In the training network, multiple inputs are passed through a single subnetwork 422 independently (424, 426), the results aggregated and supplied to the loss function, the results of which are propagated back through the subnetwork. In the creation network, the multiple inputs and the loss function are not present, leaving only the subnetwork 422. Only a single input and a single output remain, said output being the perceptual fingerprint.

With the segment fingerprints output from the encoding network, we are left with the task of combining them into a single, aggregate perceptual fingerprint at 512. There are a number of different alternative aggregation techniques, including:

Simply listing them
Building a Merkle tree
Training another encoding network to learn an aggregation function Simple listing, although perhaps not the most space-efficient method, may meet the needs of an intended use case with minimal overhead.

A variation on the perceptual fingerprint flow of FIG. 5 adds an additional initial step. Because embedded devices such as body cameras and surveillance video system should not be expected to have enough computing resources available to perform the perceptual fingerprinting task, such a point-of-capture device may first compute a simple algorithmic hash-based fingerprint on a raw video file.

That simple hash may then be submitted as a fingerprint to the system for storage in a distributed ledger or other immutable storage system provided by a blockchain service 158 and/or blockchain nodes 160. After that, the raw video file may be submitted to the system, as described above, for full perceptual fingerprinting.

Figure 6:
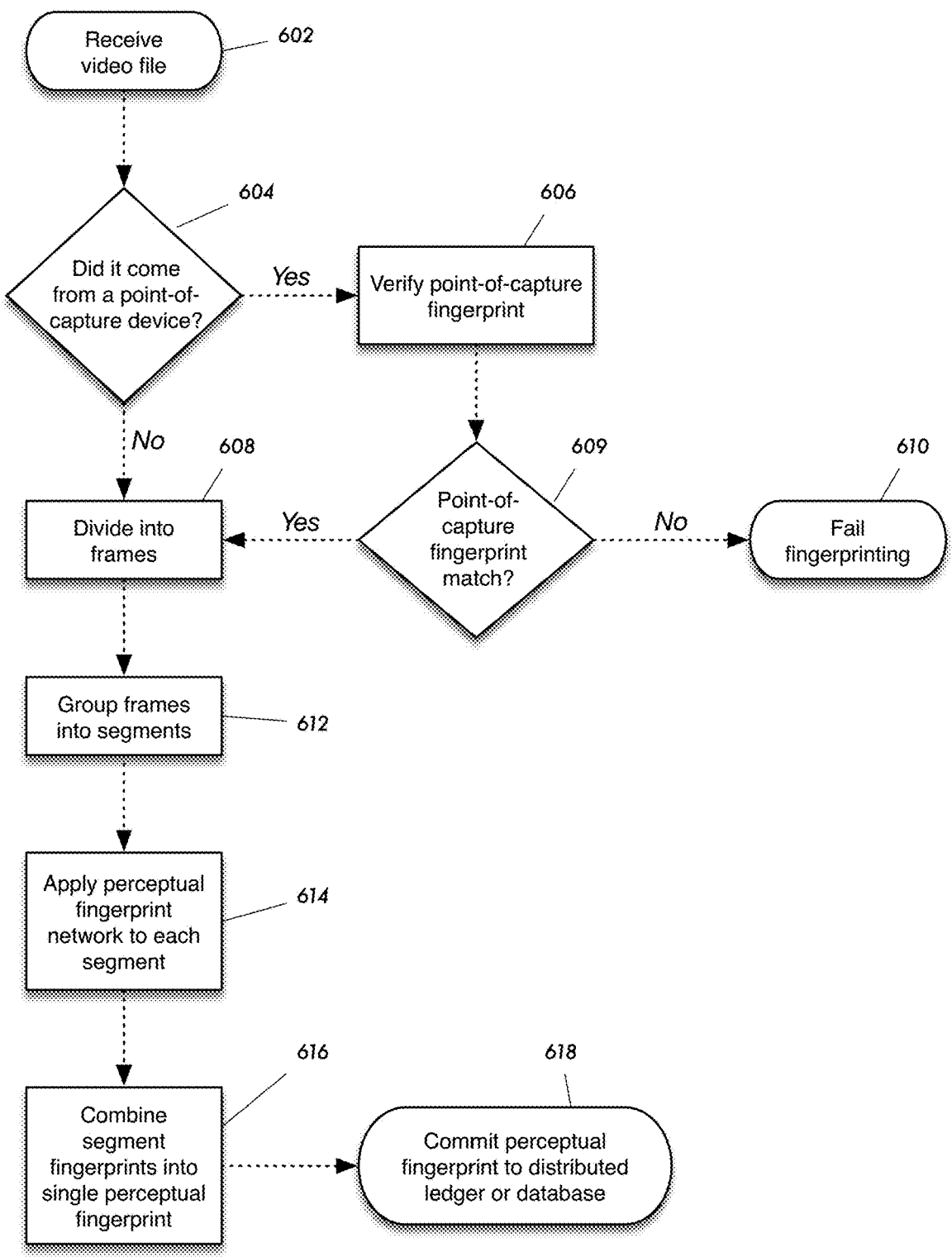
FIG. 6 is a flow for point of capture chain of custody.

FIG. 6 illustrates an example flow for such initial point of capture verification 600. Briefly, since the initial hash-based fingerprint is closely tied to the actual raw video file, the perceptual fingerprint process is able to use that to extend the chain of custody of the original video. More specifically, a received video file 602 is examined at 604 to determine if it originated from a point of capture device. If not, then it will be subjected to dividing into frames 608, grouping into segments 612, perceptual video fingerprinting 614, combining segments into a single perceptual fingerprint 616, and commit to the ledger 618.

However, if at 604 the video was received from a point of capture device, step 606 first verifies the hash-based point of capture fingerprint. At 609, when the hash-based fingerprint of the raw video file matches the hash-based fingerprint that was stored in the distributed ledger, it can serve as a verification that the video has not been altered since its original capture, and is thus eligible for further perceptual fingerprinting—and submission to steps 608-618. However, should it fail to match in step 609, the video is not eligible at 610 and any attempt to obtain a perceptual fingerprint for it will result in an error.

Point of capture verification 600 is only important for some use cases, of course, so it is not always the case that we will first look for that hash-based fingerprint before full perceptual fingerprinting.

Fingerprint Validation

Figure 7:
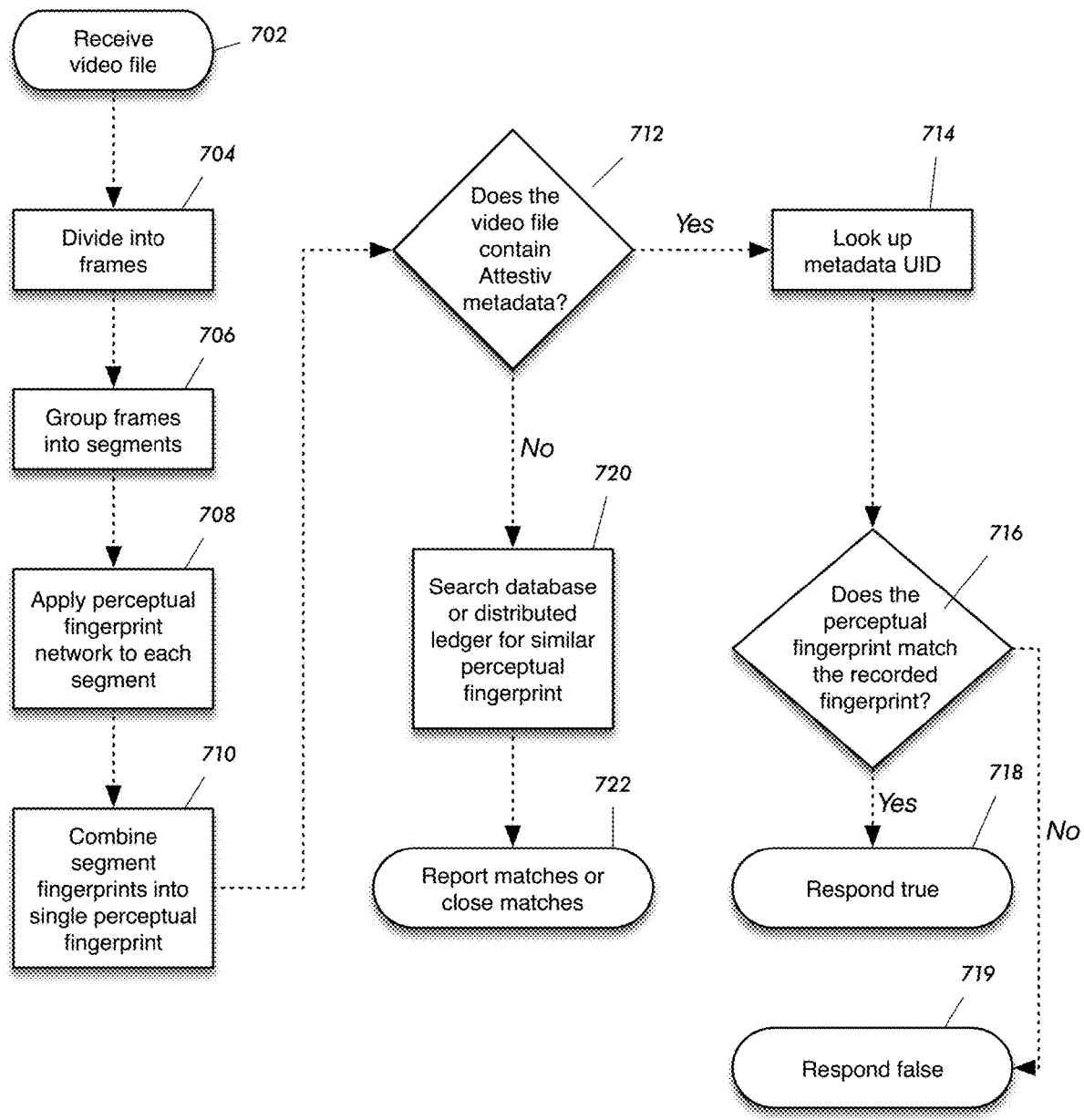
FIG. 7 is a flow for validating the authenticity of a video.

FIG. 7 shows a flow for fingerprint validation 700. Validating the authenticity of a video which has been perceptually fingerprinted is very similar to the basic process of creating a hash-based fingerprint in the first place. When a candidate video is received at 702, it is separated into frames 704, segmented 706, feature detected (not shown in FIG. 7), encoded 708, and aggregated 710 into a single perceptual fingerprint. (Noting of course that the single perceptual fingerprint consists of all of the segment fingerprints combined via some algorithm as described in connection with FIG. 5 at step 512).

In order to verify the perceptual fingerprint, the system must obtain an original perceptual fingerprint with which to compare it. In some cases, a UID can be stored in the metadata of the video file, providing us a way at 712 and 714 of looking directly into the distributed ledger to obtain the correct fingerprint. In other cases, it may be necessary to conduct a search 720 through the distributed ledger or a higher-level clustering database to find and report 722 candidates for matches.

In one variation, the search for candidates can extend to segment fingerprints, so that clips from fingerprinted videos can be compared with clips of the video in question, e.g. for the purpose of looking for copyright violations. Looking (matching) 716 segment fingerprints is also useful in the case of validating clipped versions of the video, e.g. for edited and condensed versions of long surveillance videos.

The comparison (matching) function 716 itself may be as simple as counting the bit-wise differences between the incoming video's perceptual fingerprint and the candidate original, computing a similarity score that can be transmitted to the end-user. Alternatively, a more complex function can be used that would rate the differences in a way that communicates the significance of the comparison more clearly to human users, e.g. by a log function that will serve to compress the outliers. As another alternative, another neural network could be trained to perform the comparison and return a probability score, which would offer the capability to design a function to precisely meet validation and communication needs.

Figure 8:
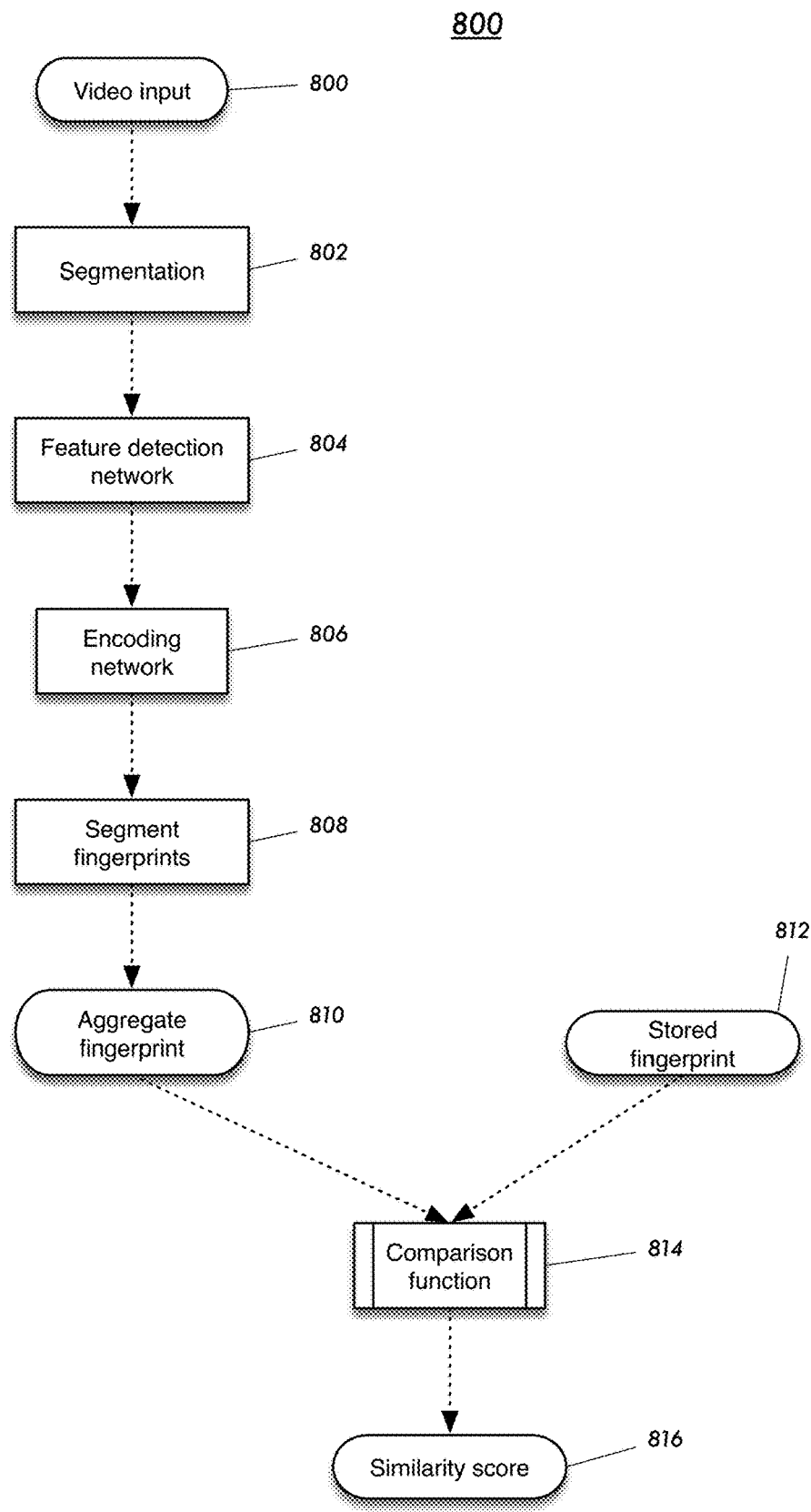
FIG. 8 shows similarity scoring.

As shown in FIG. 8, such a network would perform the operations (800, 802, 804, 806, 808, 810) in an analogous manner as the steps described (702, 704, 706, 708, 710), but in lieu of a simple matching threshold 716, it would learn a comparison function 814 to produce a probability or similar scoring metric 816.

It should be understood that the example embodiments described above may be implemented in many different ways. In some instances, the various methods and machines described herein may be implemented by a physical, virtual or hybrid general-purpose computer, or a computer network environment such as the computer network environment illustrated in FIG. 1. A general purpose computer may be transformed into the machines that execute the methods described above, for example, by loading software instructions into memory or nonvolatile storage for execution by a central processing unit.

Embodiments or aspects thereof may be implemented in the form of hardware, firmware, or software or any combination thereof. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

Therefore, while this invention has been particularly shown and described with references to example embodiments thereof, it will be understood by those skilled in the art that various changes in form and details may be made therein without departing from the scope of the claims that follow.

The invention claimed is:

1. A method for determining authenticity of a candidate video object comprising:
   receiving an original video;
   generating a set of training videos, the training set including the original and also similar and different videos;
   the similar videos including privacy redacted versions of the original such that faces are blurred;
   the different videos including deep fake versions of the original;
   the training set also including augmented versions of the original, similar and different videos, with the augmented versions having at least some different resolutions or transcodings than the original video; and
   validating the authenticity of a candidate video by matching the original against the training set, including matching the original against each of the augmented versions of the original, similar and different videos.

2. The method of claim 1 wherein the training set additionally includes segmented versions of the original, similar, different and augmented versions.

3. The method of claim 2 additionally comprising a step of:
   determining a perceptual fingerprint for the training set by mapping segmented versions that are perceptually similar to each other into a multi-dimensional hash space.

4. The method of claim 3 additional comprising a step of:
   applying a loss function to determine the perceptual fingerprint.

5. The method of claim 4 additionally comprising a step of:
   determining an aggregate perceptual fingerprint from the perceptual fingerprints for the segments as a list, a Merkle tree, or as an output from a trained aggregation function.

6. The method of claim 3 additionally comprising the steps of:
   receiving the candidate video from a point of capture device;
   applying an algorithmic hash to the candidate video; and
   match the algorithmic hash to a hash of the original video.

7. The method of claim 3 wherein the validation step further determines a similarity between a perceptual fingerprint derived for the candidate video and the perceptual fingerprint from the training set.

8. The method of claim 3 wherein the validation step further trains a neural network to produce a probability score.

9. The method of claim 3 wherein one or more videos in the training set and corresponding perceptual fingerprints are stored on a blockchain with the original video.

10. The method of claim 1 wherein the similar videos include frame loss versions.

11. The method of claim 1 wherein the similar videos include transcoded versions.

12. The method of claim 1 wherein the similar videos include privacy-redacted versions.

13. The method of claim 1 wherein the deep fake versions that include videos with replaced faces in the original are used as different videos.

* * * * *